US 7,249,209 B2

(12) United States Patent
Yang

(10) Patent No.: US 7,249,209 B2
(45) Date of Patent: Jul. 24, 2007

(54) SYSTEM AND METHOD FOR DYNAMICALLY ALLOCATING INTER INTEGRATED CIRCUITS ADDRESSES TO MULTIPLE SLAVES

(75) Inventor: Sheng-Hung Yang, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 120 days.

(21) Appl. No.: 11/164,664

(22) Filed: Dec. 1, 2005

(65) Prior Publication Data

US 2006/0195639 A1   Aug. 31, 2006

(30) Foreign Application Priority Data

Dec. 3, 2004   (TW) ............................ 93137385 A

(51) Int. Cl.
*G06F 13/00* (2006.01)
*G06F 15/16* (2006.01)
(52) U.S. Cl. ..................................... 710/110
(58) Field of Classification Search .................... None
See application file for complete search history.

(56) References Cited

U.S. PATENT DOCUMENTS 6,295,053 B1* 9/2001 Tsai et al. ................. 345/204
6,622,177 B1* 9/2003 Eilert et al. ................. 710/3
6,629,172 B1  9/2003 Andersson et al.
6,745,270 B1  6/2004 Barenys et al.

* cited by examiner

*Primary Examiner*—Rehana Perveen
*Assistant Examiner*—Mohammed Rehman
(74) *Attorney, Agent, or Firm*—Winston Hsu

(57) ABSTRACT

A system for dynamically allocating inter integrated circuits ($I^2C$) addresses to multiple slave includes a host (1), a plurality of slaves (2) and an $I^2C$ bus (3). Each slave includes a processor (20) for performing an $I^2C$ address allocating program (200), which includes a signal setting module (201), a delay controlling module (202) and an $I^2C$ address calculating module (203). The signal setting module is used for setting a signal value of an input pin of each slave, and checking the signal value of an output pin of each slave. The delay controlling module is used for controlling a synchronous booting error time for each slave, and setting a security time for allocating a unique $I^2C$ address to each slave. The $I^2C$ address calculating module is used for calculating a unique $I^2C$ address for each slave, and obtaining the $I^2C$ address from the host. A related method is also disclosed.

13 Claims, 4 Drawing Sheets

SYSTEM AND METHOD FOR DYNAMICALLY ALLOCATING INTER INTEGRATED CIRCUITS ADDRESSES TO MULTIPLE SLAVES

FIELD OF THE INVENTION

The present invention relates to systems and methods for allocating bus addresses to slaves in a computer, and more particularly to a system and method for dynamically allocating inter integrated circuits ($I^2C$) addresses to multiple slaves attached to an $I^2C$ bus.

DESCRIPTION OF RELATED ART

In modern electronic systems there are a number of inter integrated circuits ($I^2C$) that need to communicate with each other and with off-chip elements. To maximize hardware efficiency and simplify circuit design, a simple bi-directional two-wire serial bus, that is, a serial data (SDA) bus and a serial clock (SCL) bus for $I^2C$ control have been developed. This $I^2C$ bus supports any integrated chips fabrication process. With the extremely broad range of $I^2C$ compatible chips, $I^2C$ has become the worldwide industry standard proprietary control bus.

Each device connected to the $I^2C$ bus is recognized by a unique address and can operate as either a receiver-only device (e.g. an LCD Driver) or a transceiver with the capability to both receive and send information (such as I/O port). Transceivers or receivers can operate in either master or slave mode, depending on whether the chip has to initiate a data transfer or is only addressed. The $I^2C$ bus is a multi-master bus. For example, it can be controlled by more than one integrated chips connected to it.

Devices connected to the $I^2C$ bus are selected by an 8-bit address which is sent over the bus in the same way as data bytes. The least significant bit of this address acts as a read/write control signal, and is set to "0" to make a slave as a receiver and "1" to make the slave as a transceiver. The address byte is the first byte transmitted after a start condition, and is always transmitted by a host. By convention, if the slave is a receiver and the slave contains several registers, the next byte transmitted after the address is an internal register address for the slave. However, this is not required by the $I^2C$ specification. The address of a particular slave is often determined when the $I^2C$ is manufactured. If there is more than one slave with the same address on the $I^2C$ bus, it is difficult to access each slave individually.

Therefore, each slave coupled to a system management bus based on the $I^2C$ protocol is required to have its own $I^2C$ address for proper operation of the bus. The current method for assigning addresses to agents on the bus is for the designer to provide a hard wired solution or provide dip switches or jumpers. Although hard address bits assigns every slave to a unique address, this approach requires extra pads and requires the maximum number of slaves capable of being attached to the bus to be determined upon fabrication. When the designer provides dip switches or jumpers, users are required to either manually set the dip switches or jumpers or use configuration software to operate logical switches. This requirement to manually set switches or to operate switches through software can be both tedious and error prone.

What is needed, therefore, is a system for dynamically allocating $I^2C$ addresses to multiple slaves attached to an $I^2C$ bus of a host, which is unencumbered with express and inherent limitations associated with prior art solutions.

Similarly, what is also needed is a method for dynamically allocating $I^2C$ addresses to multiple slaves attached to an $I^2C$ bus of a host, which is unencumbered with express and inherent limitations associated with prior art solutions.

SUMMARY OF INVENTION

A system for dynamically allocating inter integrated circuits ($I^2C$) addresses to multiple slaves in accordance with a preferred embodiment includes a host, a plurality of slaves and an $I^2C$ bus. The host includes a central processing unit (CPU) and an $I^2C$ interface. The $I^2C$ interface is used for sending $I^2C$ signal to each slave via the $I^2C$ bus. Each slave includes a processor, and three integrated chips which are depicted as J3, J5 and J6. The processor is used for performing an $I^2C$ address allocating program which comprises a signal setting module, a delay controlling module and an $I^2C$ address calculating module. The signal setting module is used for setting an $I^2C$ signal value of an input pin of each slave, and checking the $I^2C$ signal value of an output pin of each slave. The delay controlling module is used for controlling a synchronous booting error time for each slave, and setting a security time for allocating a unique $I^2C$ address to each slave. The $I^2C$ address calculating module is used for calculating a unique $I^2C$ address for each slave, and obtaining the $I^2C$ address from the host.

Another preferred embodiment provides a method for dynamically allocating $I^2C$ addresses to multiple slaves by utilizing the above system. The method includes the steps: (a) providing and initializing a count variable i as "0;" (b) setting an $I^2C$ signal of an output pin of a slave to "0;" (c) delaying a first time; (d) calculating i=i+1; (e) determining whether the $I^2C$ signal value of an input pin of the slave is equal to "1;" (f) checking whether the $I^2C$ signal value of an input pin of the slave is equal to "1" by means of delaying a second time, if the $I^2C$ signal value of the input pin of the slave is not equal to "1;" (g) setting the value of the count variable "i" as an $I^2C$ address of the slave, if the $I^2C$ signal value of the slave is equal to "1;" (h) determining whether each slave has a unique $I^2C$ address; and (i) allocating a new $I^2C$ address to other slave until all slaves have their unique $I^2C$ address.

In summary, the system and method can dynamically allocate a unique $I^2C$ address to each slave attached to an $I^2C$ bus of a host, so as to set up different communication channels between the host and each slave.

Other advantages and novel features of the embodiments will be drawn from the following detailed description with reference to the attached drawings, in which:

DETAILED DESCRIPTION

Figure 1:
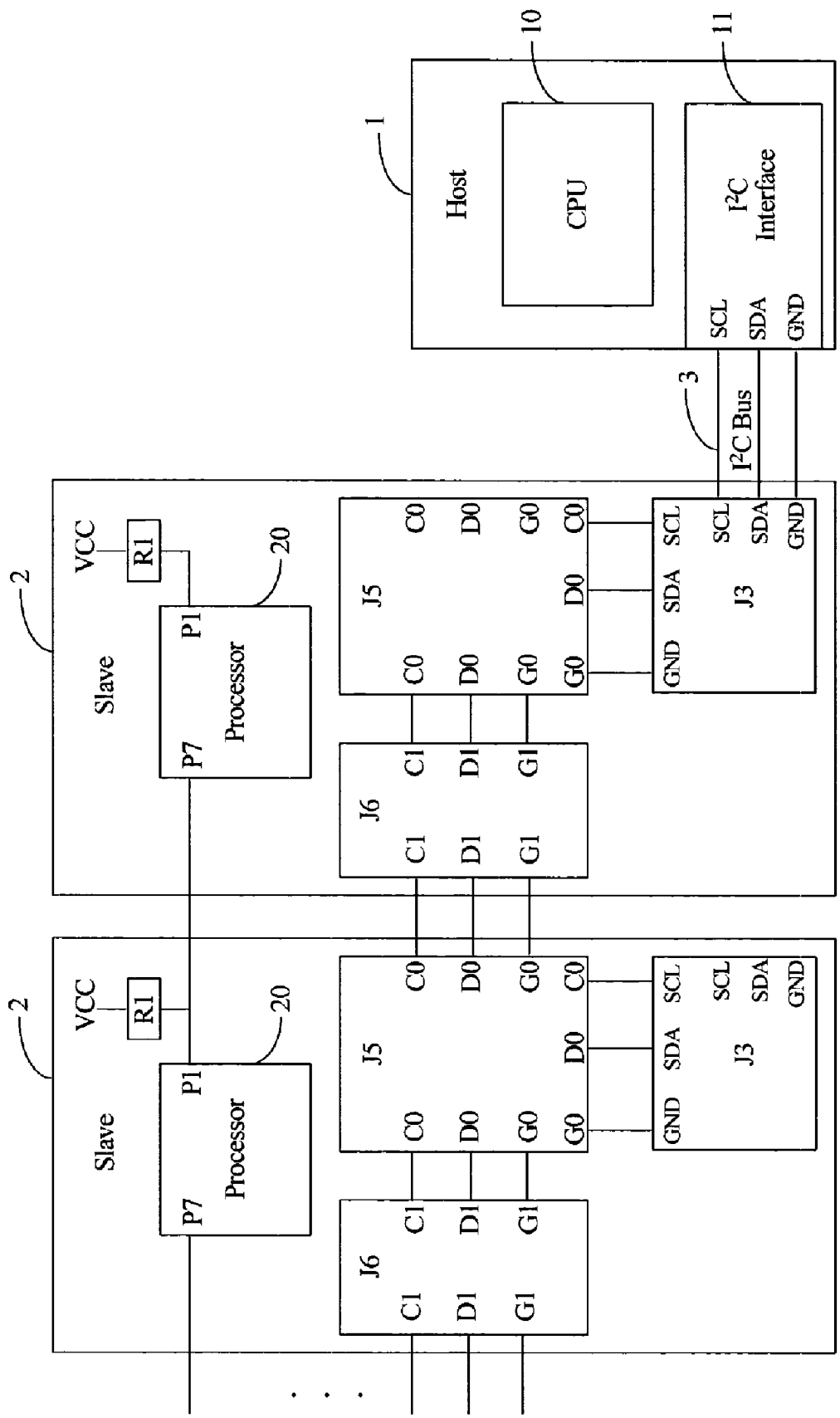
FIG. 1 is a schematic diagram of hardware infrastructure of a system for dynamically allocating $I^2C$ addresses to multiple slaves in accordance with a preferred embodiment of the present invention.

FIG. 1 is a schematic diagram of hardware infrastructure of a system for dynamically allocating inter integrated circuits (I²C) addresses to multiple slaves (hereinafter, "the system") in accordance with a preferred embodiment of the present invention. The system includes a host 1, a plurality of slaves 2, and an I²C bus 3. The host 1 may be a computer, which includes a central processing unit (CPU) 10 and an I²C interface 11. The CPU 10 is used for allocating different I²C addresses to each slave 2 connected to the I²C bus 3, and for setting different communication channels between the host 1 and each slave 2. The I²C interface 11 is used for transmitting I²C signal to each slave 2 via the I²C bus 3. The I²C signal are used for controlling each slave 2 to access the host 1 via the I²C bus 3, which typically includes a serial data (SDA) signal, a serial clock (SCL) signal and a ground (GND) signal. Each slave 2 at least includes a processor 20 and three integrated chips (ICs) which are symbolically depicted as J3, J5, and J6, those of which are both used to receive and send I²C signal to each slave 2 respectively. The processor 20 includes an input pin (symbolically depicted as P1) and an output pin (symbolically depicted as P7).

In the preferred embodiment of the present invention, for simplification, only two slaves 2 (in fact, tow or more slaves) are attached to the host 1. Referring to FIG. 1, the pin P1 connects to a voltage controlled circuit (VCC) through a resistor R1, and the pin P7 connects to the pin P1 of the processor 20 of the next slave 2. The resistor R1 is used for providing a high voltage to the pin P1 when it has not received an I²C signal from the pin P7. The SCL pin, the SDA pin and the GND pin of the chip J3 of the first slave 2 are respectively connected to the I²C bus 3, those of which are used for sending the I²C signal to the pin C0, the pin D0 and the pin G0 of the chip J5. The chip J5 is used for transmitting the I²C signal from the chip J3 of the first slave 2 to the chip J6. The chip J6 is used for transmitting the I²C signal from the chip J5 to next slave 2.

Figure 2:
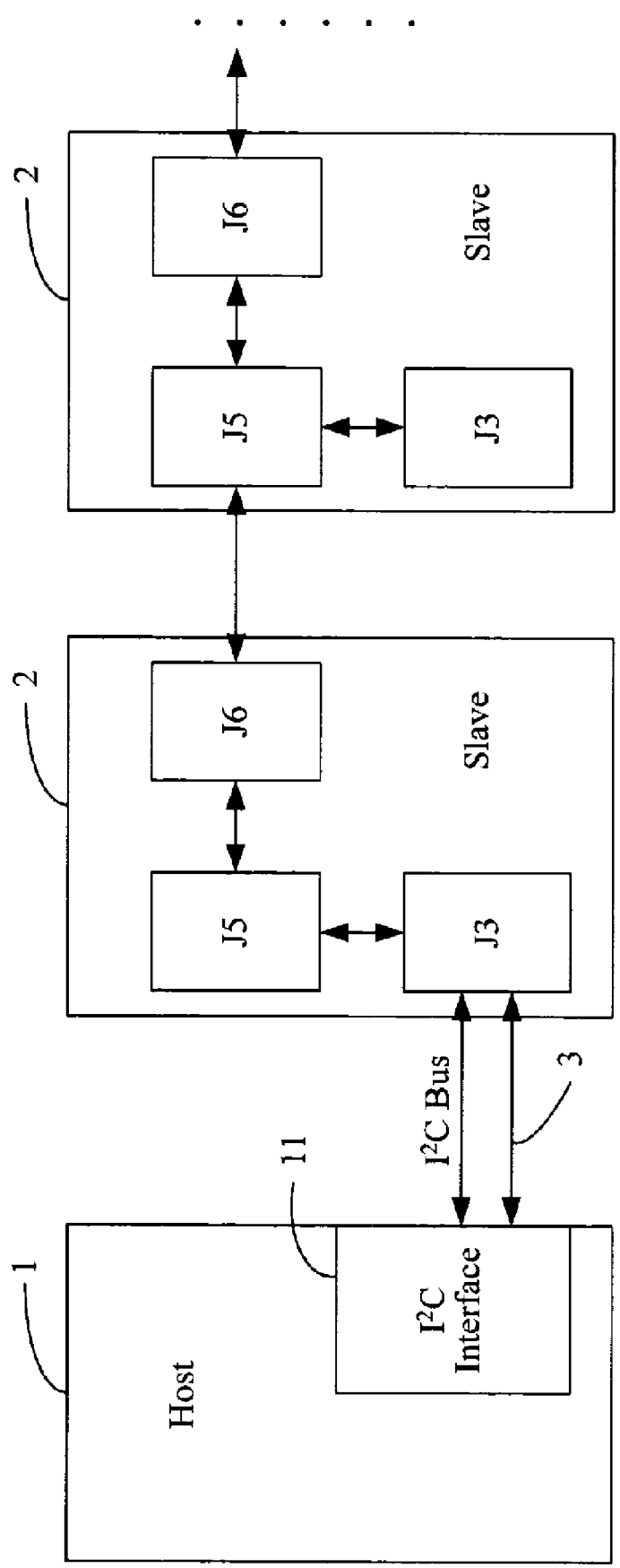
FIG. 2 illustrates main signal interchanges between a computer and multiple slaves of the preferred system.

FIG. 2 illustrates main signal interchanges between a host 1 and multiple slaves 2 of the preferred system. Firstly, the host 1 sends the I²C signal to the chip J3 of the first slave 2 via the I²C bus 3. Secondly, the chip J3 of the first slave 2 transmits the I²C signal from the host 1 to the chip J6 through the chip J5. Finally, the chip J6 of the first slave 2 transmits the I²C signal to the chip J5 of the second slave 2. The second slave 2 receives the I²C signal from the host 1 via the first slave 2 because the chip J3 of the second slave 2 is not connected to the I²C interface 11 of the host 1. From the procedure described above, each slave 2 directly or indirectly shares the I²C bus 3 in order to receive the I²C signal from the host 1. Therefore, each slave 2 has been allocated a unique I²C address for communicating with the host 1 respectively.

Figure 3:
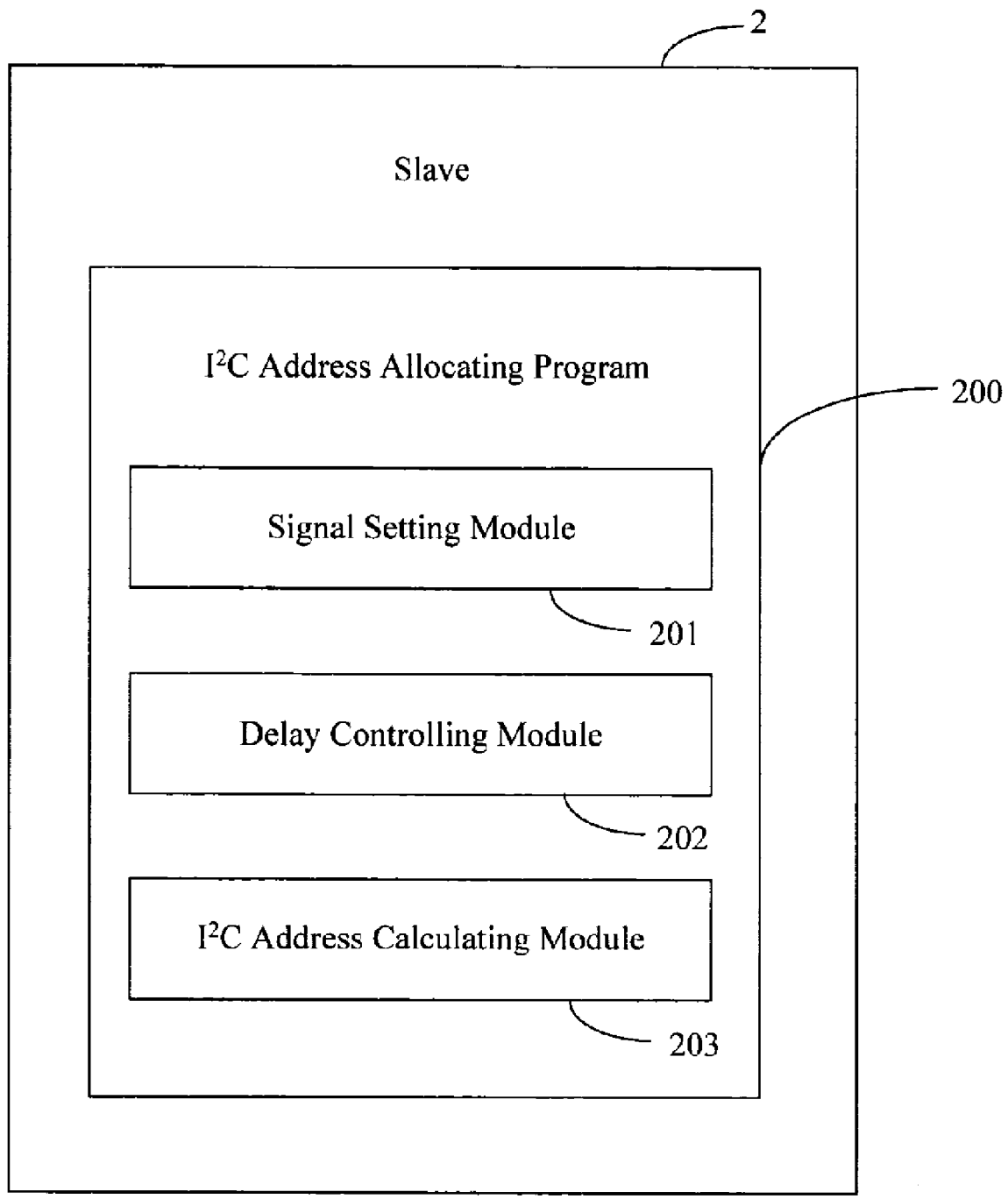
FIG. 3 is a diagram showing function modules of the slave of FIG. 1.

FIG. 3 is a diagram showing function modules of each slave 2. Each processor 20 of slave 2 respectively loads an I²C address allocating program 200, which is used for allocating an unique I²C address to each slave 2 from the host 1. The I²C address allocating program 200 includes a signal setting module 201, a delay controlling module 202, and an I²C address calculating module 203. The signal setting module 201 is used for setting the I²C signal value of the pin P7 of each slave 2, and checking the I²C signal value of the pin P1 of each slave 2. The I²C signal value is "1" which denotes a high level signal. In contrast, the I²C signal value is "0" which denotes a low level signal. The delay controlling module 202 is used for controlling a synchronous booting error interval for each slave 2, and setting a security time for allocating an I²C address to each slave 2. The I²C address calculating module 203 is used for calculating a unique I²C address for each slave 2 to accesses the host 1, and obtaining the I²C address from the host 1 to each slave 2 in order to respectively set up a communication channel with the host 1.

Figure 4:
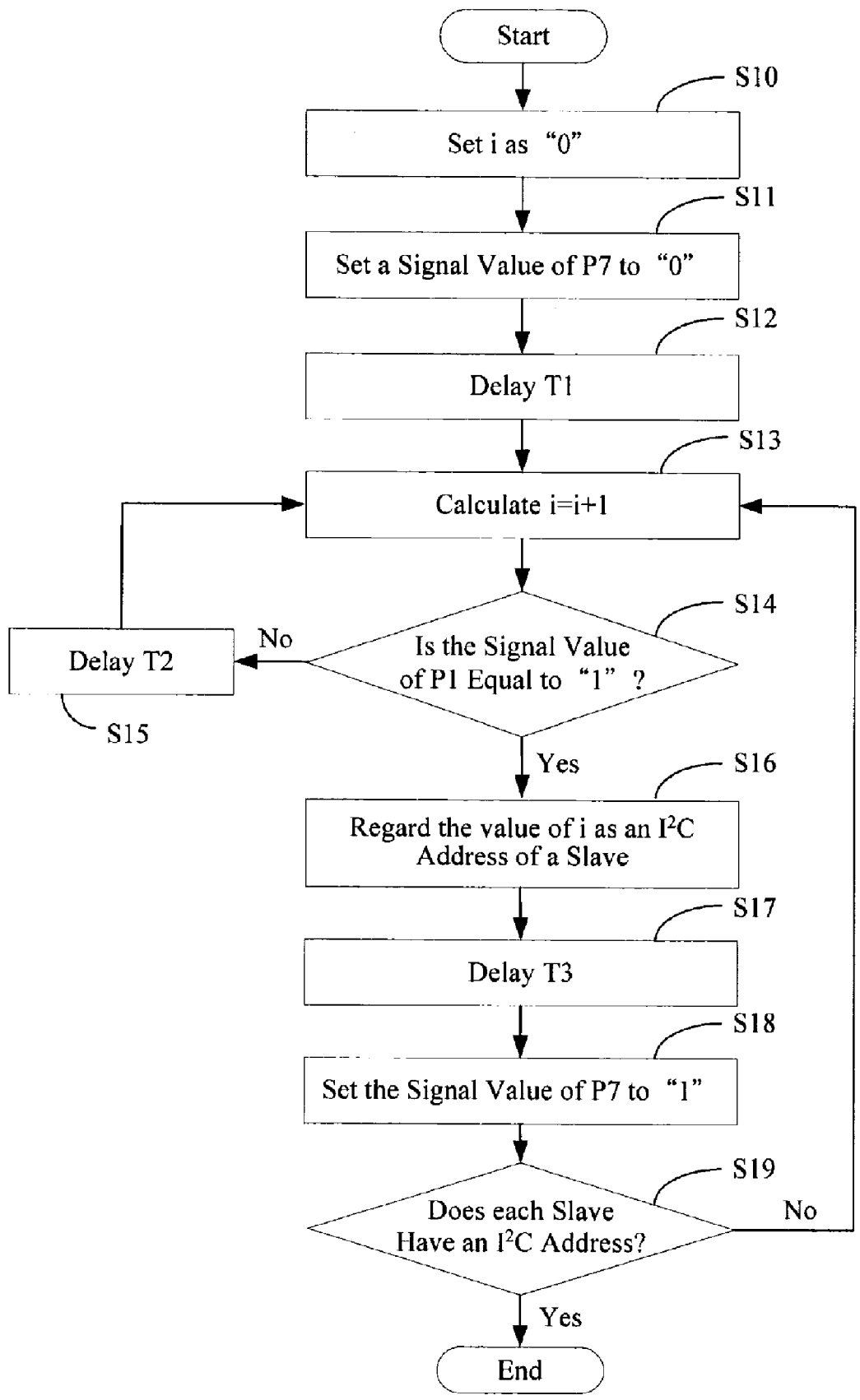
FIG. 4 is a flowchart of a preferred method for dynamically allocating $I^2C$ addresses to multiple slaves by implementing the system.

FIG. 4 is a flowchart of a preferred method for dynamically allocating I²C addresses to multiple slaves by implementing the system. In step S10, the processor 20 of each slave 2 sets a count variable i as "0" when each slave 2 boots its system. Meanwhile, the resistor R1 provides a high level signal, which value is "1", to the input pin P1 when it has not received an I²C signal from the host 1. In step S11, the signal setting module 201 sets the signal value of the output pin P7 as "0," at this time, the signal value of the pin P1 connected to the pin P7 is "0." In step S12, the delay controlling module 202 delays a first time (symbolically depicted as T1) to control a synchronous booting error interval for each slave 2, such as 70 ms. In step S13, the I²C address calculating module 203 calculates the count variable i, that is i=i+1. In Step S14, the signal setting module 201 determines whether the signal value of the pin P1 is equal to "1." If the signal value of the pin P1 is not equal to "1," that is, the slave 2 has not received the I²C signal, in step S15, the signal setting module 201 determines whether the signal value of the pin P1 is equal to "1" by means of delaying a second time (symbolically depicted as T2), such as 100 ms. Otherwise, if the signal value of the pin P1 is equal to "1," that is, the slave 2 has received the I²C signal, in step S16, the I²C address calculating module 203 calculates the I²C address of the slave 2, that is, the host 1 allocates the value of the count variable i to the slave 2. In step S17, the delay controlling module 202 delays a third time (symbolically depicted as T3), such as 50 ms. In step S18, the signal setting module 201 sets the signal value of the pin P7 to "1." In step S19, the host 1 determines whether each slave 2 has a unique I²C address. If each slave 2 has not a unique I²C address, the procedure returns to the step S13 described above. Otherwise, if each slave 2 has a unique I²C address, the procedure ends.

The following describes an example of implementing the system and method for dynamically allocating the I²C address to each slave 2. Each processor 20 of the slave 2 sets a count variable i as "0" when each slave 2 boots up. Meanwhile, the resistor R1 provides a high level signal, which value is "1", to the input pin P1 when pin P1 has not received I²C signal from the host 1. The signal setting module 201 sets the signal value of the output pin P7 to "0," at this time, the signal value of the pin P1 connected to the pin P7 is "0." The delay controlling module 202 delays T1=70 ms. Then the I²C address calculating module 203 calculates i=i+1=0+1=1, and regards i=1 (wherein the number "1" is a decimal number) as the I²C address of the first slave 2. When the second slave 2 boots up, the signal setting module 201 determines whether the signal value of the pin P7 of the second slave 2 is equal to "1." If the delay controlling module 202 delays T2=100 ms, the signal value of the pin P7 of the second slave 2 equals to "1." The I²C address calculating module 203 calculates i=i+1=1+1=2, and regards i=2 as the I²C address of the second slave 2. According to the above procedures, it can calculate the I²C address of the third slave 2 as i=3, and the I²C address of the forth slave 2 as i=4, until all slaves 2 have obtained a respective unique I²C address from the host 1.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for dynamically allocating inter integrated circuits (I²C) addresses to multiple slaves, the system comprising a host, an I²C bus and a plurality of slaves, wherein:
the host comprising an I²C interface for sending I²C signal to each slave via the I²C bus;
each slave comprising a processor for executing an I²C address allocating program, wherein the I²C address allocating program comprises:
a signal setting module for setting an I²C signal value of an input pin of each slave, and checking the I²C signal value of an output pin of each slave;
a delay controlling module for controlling a synchronous booting error time for each slave, and setting a security time for allocating a unique I²C address to each slave; and
an I²C address calculating module for calculating the unique I²C address for each slave, and obtaining the corresponding I²C address from the host.

2. The system according to claim 1, wherein the I²C signal include a serial data (SDA) signal, a serial clock (SCL) signal and a ground (GND) signal.

3. The system according to claim 1, wherein the input pin connects to a voltage controlled circuit (VCC) via a resistor, which is used for providing a high voltage to the input pin when input pin has not received the I²C signal.

4. The system according to claim 1, wherein the signal setting module sets the signal value of the output pin to "0" when the slave boots up.

5. The system according to claim 1, wherein the signal setting module checks whether the slave has received the I²C signal by means of determining whether the signal value of the input pin is equal to "1".

6. A method for dynamically allocating inter integrated circuits (I²C) addresses to multiple slaves attached to a host having an I²C bus, the method comprising the steps of:
providing and initializing a count variable "i;"
setting an I²C signal of an output pin of a slave to "0;"
delaying a first time;
calculating the count variable "i;"
determining whether the I²C signal value of an input pin of the slave is equal to "1;" and
regarding the value of the count variable "i" as an I²C address of the slave, if the I²C signal value of the input pin of the slave is equal to "1".

7. The method according to claim 6, further comprising the steps of:
determining whether each slave has a unique I²C address; and
allocating a new I²C address to next slave until each slave has a unique I²C address.

8. The method according to claim 6, further comprising the step of providing a high level signal to the input pin of the slave by means of utilizing a resistor when the input pin has not received the I²C signal.

9. The method according to claim 6, wherein the first time is for controlling a synchronous booting error time for the slave.

10. The method according to claim 6, further comprising the step of checking the I²C signal value of an input pin of the slave by delaying a second time, if the I²C signal value of the input pin of the slave is not equal to "1".

11. The method according to claim 6, further comprising the step of delaying a third time for setting a security time for allocating a unique I²C address to each slave.

12. A system for dynamically allocating inter integrated circuits (I²C) addresses, comprising an I²C address allocating program installed in a processor of each slave, wherein a plurality of the identical slaves are cascaded one by one and one of the slaves is connected to a host via an I²C bus, and the I²C address allocating program comprises:
a signal setting module for setting an I²C signal value of an input pin of each slave, and checking the I²C signal value of an output pin of the slave;
a delay controlling module for controlling a synchronous booting error time for each slave, and setting a security time for allocating a unique I²C address to the slave; and
an I²C address calculating module for calculating the unique I²C address for each slave, and obtaining a corresponding I²C address from the host.

13. The system according to claim 12, wherein the I²C signal include a serial data (SDA) signal, a serial clock (SCL) signal and a ground (GND) signal.

* * * * *